INVENTOR.
JAMES C. MILLER
BY John V. Regan
ATTORNEY

INVENTOR.
JAMES C. MILLER
BY John V. Regan
ATTORNEY

INVENTOR.
JAMES C. MILLER
BY John V. Regan
ATTORNEY

INVENTOR.
JAMES C. MILLER
BY John V. Regan
ATTORNEY

United States Patent Office 3,339,185

Patented Aug. 29, 1967

3,339,185

MEMORY CIRCUITS EMPLOYING NEGATIVE RESISTANCE ELEMENTS

James C. Miller, Hamilton Square, N.J., assignor to Radio Corporation of America, a corporation of Delaware Filed Aug. 31, 1959, Ser. No. 837,210

32 Claims. (Cl. 340—173)

The present invention relates to improved circuits employing active negative resistance elements such as "negative resistance" diodes. The invention is especially useful in the electrical transmission and handling of information.

The circuits of the present invention include an active element, such as a negative resistance diode, having two regions in its operating range exhibiting a positive resistance, and a region between these positive resistance regions exhibiting a negative resistance. A quiescent bias is applied to this element having a value such that less energy is required to drive the element from one of its positive resistance regions to its negative resistance region than from the other. The state of the element (whether it is in the one or the other of its positive resistance regions) is determined by applying to it an alternating signal having a peak value which is sufficient to drive the element into its negative resistance region from the one positive resistance region, but not from the other positive resistance region.

In a preferred form of the invention, the active element is coupled to a resonant circuit tuned to a frequency *f*. The alternating signal is preferably at a frequency 2*f*. When the element is in one positive resistance region, the alternating signal drives it into and out of its negative resistance region and the resonant circuit oscillates at frequency *f*. When the diode is in its other positive resistance region, the alternating signal is of insufficient amplitude to drive the element into its negative resistance region and the resonant circuit does not oscillate. Accordingly, the presence or absence of oscillations in the resonant circuit is indicative of the state of the active element. According to a further feature of the invention, the oscillations are sensed by an antenna.

The invention will be described in greater detail by reference to the following description taken in connection with the accompanying drawing in which.

Figure 3:
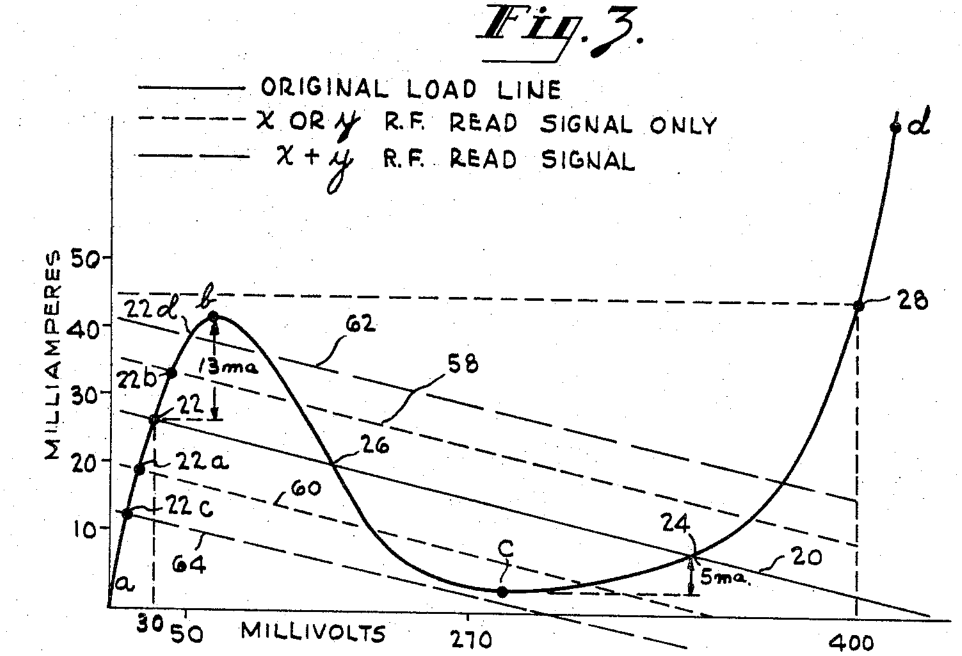
FIGS. 3 and 4 are curves useful in explaining the operation of the circuits of FIGS. 1 and 2.
Figure 3A:
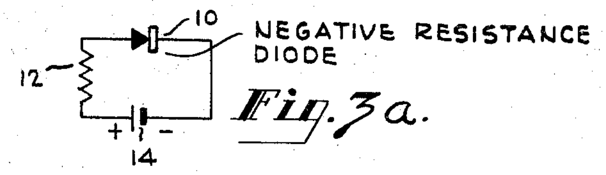
Figure 5:
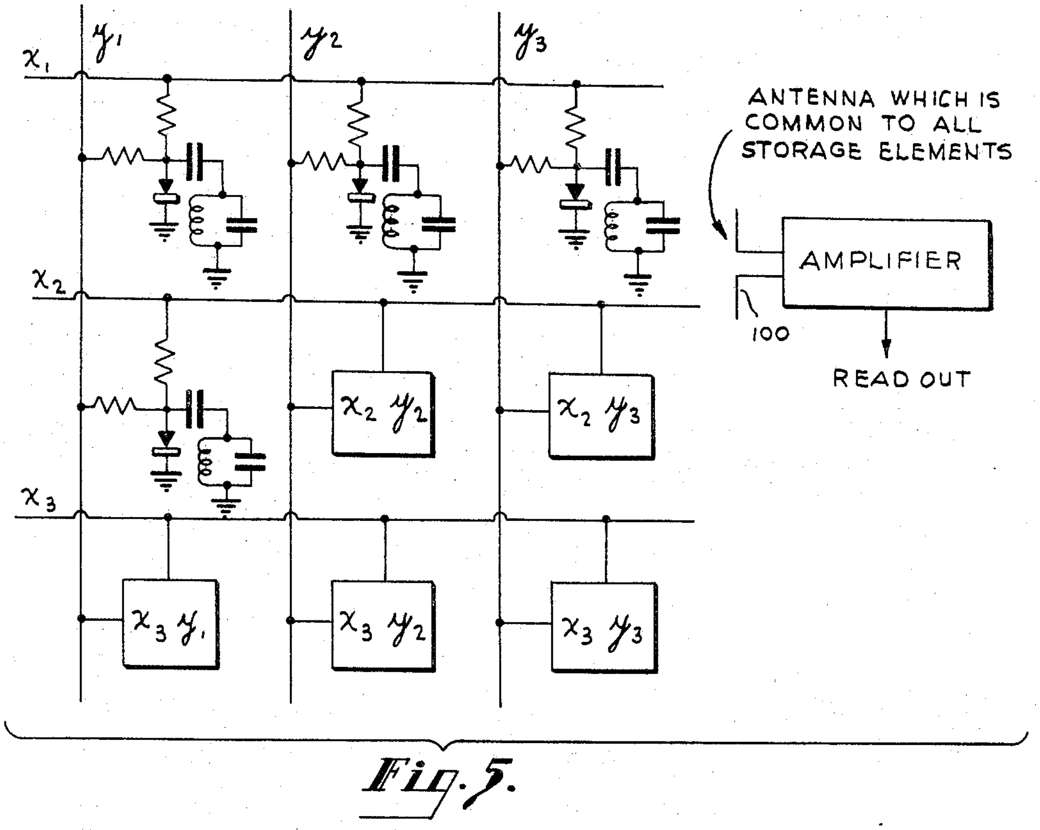
Figure 6:
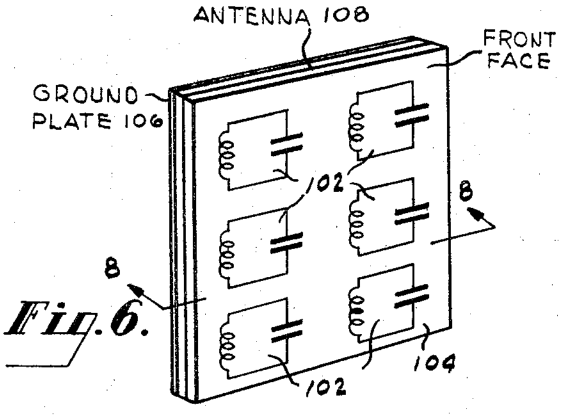
Figure 7:
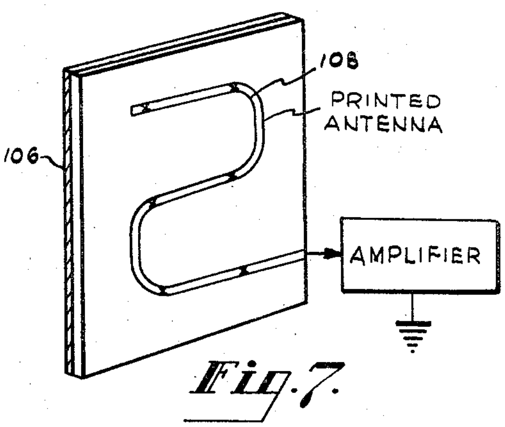
Figure 8:
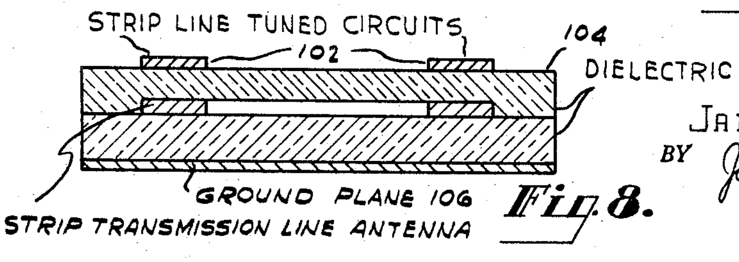
Figure 9:
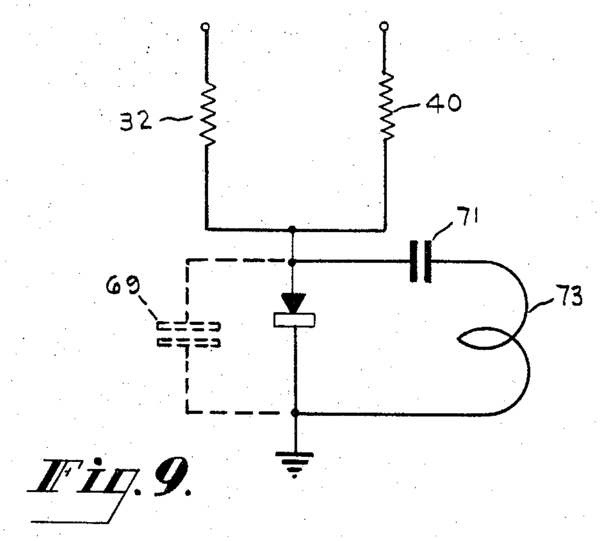
Figure 10:
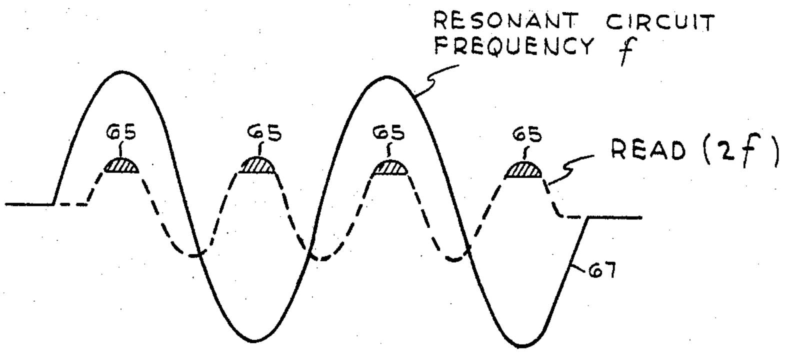

FIG. 3*a* is a highly simplified circuit useful in understanding FIG. 3;

FIG. 5 is a block and schematic circuit diagram of a memory array according to the present invention;

FIG. 6 is a schematic, perspective view of a strip transmission line memory array according to the present invention;

FIG. 7 is a perspective view of the ground plane and antenna of the memory array of FIG. 6;

FIG. 8 is a cross-sectional view taken through the line 8—8 of FIG. 6;

FIG. 9 is a schematic drawing of another embodiment of the present invention; and FIG. 10 is a drawing of waveforms to help explain the operation of the invention.

A characteristic curve of current versus voltage for a typical negative resistance diode of the voltage controlled type is shown in FIG. 3. The values of millivolts and milliamperes given are typical but are not meant to be limiting. The milliampere range, for example, may differ substantially for different diodes. The portions *ab* and *cd* of the volt-ampere (E–I) characteristic are regions of positive resistance (the inverse of the slope, $\Delta E/\Delta I$, which is equal to resistance R, is a positive quantity). The portion *bc* of the volt-ampere characteristic is a region of negative resistance. (The inverse of the slope of the portion *bc* is negative.)

A circuit for ascertaining the characteristic curve for a negative resistance diode 10 (see FIG. 3*a*) may include, in series, the diode, a load resistor 12 having a resistance at least ten times the diode resistance, and a source of voltage 14 for forward biasing the diode. The value of resistor 12 may include the internal resistance of the source 14. The source and load resistor together, because of the resistance value, act somewhat like a constant-current source and load line 20 has the slope indicated. If the source were a perfect constant-current source, load line 20 would be parallel to the millivolt axis.

Load line 20 intersects the positive resistance region *ab* of the characteristic at 22 and the positive resistance region *cd* of the characteristic at 24. It also intersects the negative resistance region *bc* of the diode at 26. The points 22 and 24 are stable operating points and the point 26 is an unstable operating point.

Assume that initially the voltage across the diode is of the order of 30 millivolts or so. The current through the diode is about 27 milliamperes and the diode is at a stable low voltage state represented by the point 22. When the current through the diode is increased in the forward direction, for example, by changing the source voltage, the load line is shifted on the characteristic until the load line passes through point *b*. The point *b* represents a current of about 43 milliamperes. Increasing the forward current to a value greater than this drives the load line in the upward direction, beyond the point *b* It is believed that the diode is thereby driven into its negative resistance region but, since the latter represents an unstable condition of the diode, the diode cannot remain there and rapidly switches to its second stable state—the intersection of the shifted load line and positive resistance region *cd*.

If, after the diode is switched, the current returns to the value indicated by the intersection of the load line 20 and the curve, the voltage reduces to a lower value as indicated by point 24. The point 24 or some other stable intersection point of a suitable load line and the positive slope region *cd* of the characteristic is hereafter termed the high voltage state of the diode and the point 22 or some other stable intersection point of the suitable load line and the positive portion *ab* of the characteristic is hereafter termed the low voltage state of the diode. One of the stable diode states may represent storage of the binary digit one, and the other, storage of the binary digit zero.

In a practical circuit the diode may be switched from one stable state to another by very short current pulses—of the order of 0.1–2 millimicroseconds in duration, which, in effect, add or subtract from the supply voltage. A current pulse in a direction to increase the forward current of the diode, can switch the diode from its low to its high state, and a current pulse in a direction to decrease the forward diode current, can switch the diode from its high to its low state.

Further discussion of negative resistance diodes having a characteristic such as shown in FIGURE 3 may be found in an article by H. S. Sommers, Jr., appearing in the Proceedings of the IRE, July 1959, page 1201. These diodes are now commonly known as "tunnel" diodes.

Figure 1:
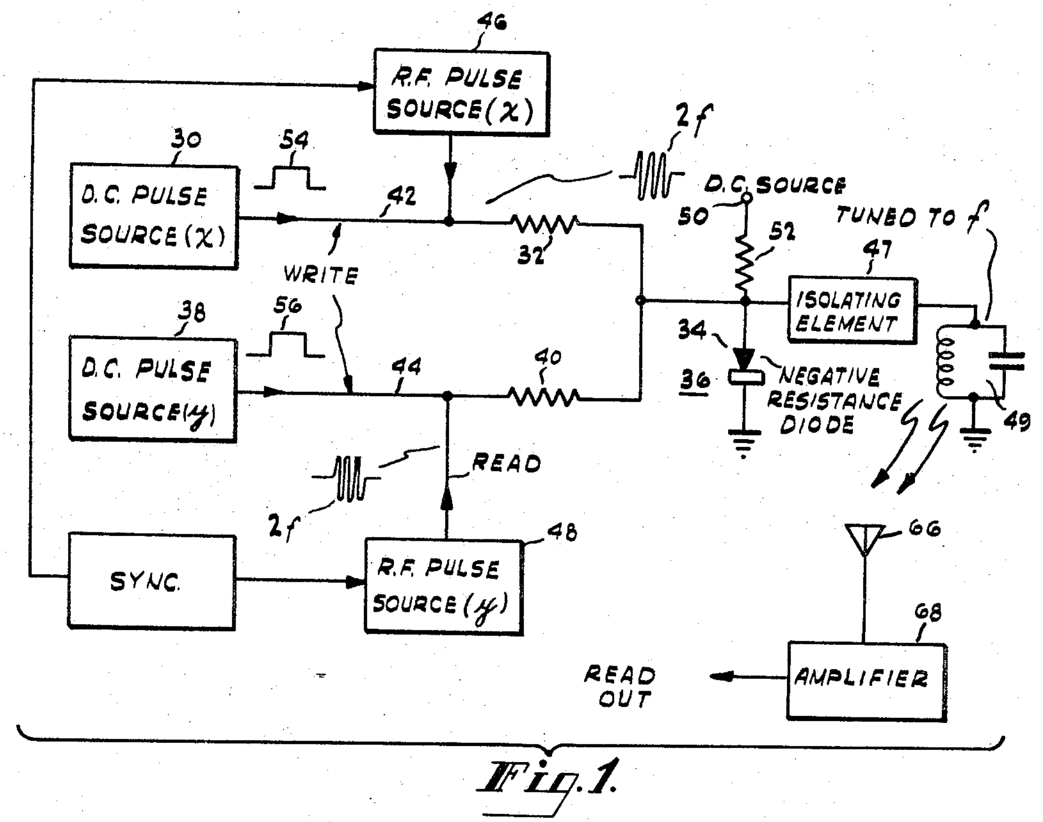
FIG. 1 is a block and schematic circuit diagram of one form of the present invention.

FIG. 1 illustrates a memory circuit embodiment of the present invention. A direct current (D.C.) pulse source 30 is connected via a lead 42 through a resistor 32 to the anode 34 of a negative resistance diode 36. A second direct current pulse source 38 is connected via a lead 44 through a resistor 40 also to the diode anode 34. Capacitors or diodes may be used instead of resistors 32 and 40, if desired. The lead 42 carries information designated *x* information and may therefore be thought of as an *x* bus, and the lead 44 carries information designated *y* information and may therefore be thought of as a *y* bus. This portion of the system is for writing information into the diode.

A radio-frequency (R.F.) pulse source 46 is connected to *x* bus 42 and a second radio frequency pulse source 48 is connected to *y* bus 44. Sources 30, 38, 46 and 48 are isolated, as by having sufficiently high internal impedances effectively to be isolated from one another, so that the radio-frequency output from sources 46 and 48 do not affect the direct current pulse sources 30 and 38 and vice versa.

The diode-anode 34 is connected through an isolating element 47 to a resonant circuit 49 which may be, for example, a parallel resonant circuit, as shown. The purpose of the isolating element 47 is to decouple the resonant circuit from the diode 36 and to prevent or lessen the flow of direct current through the inductor. The isolating element 47 may take the form of a capacitor, a normal semiconductor diode, a high value of resistance or other analogous element. The steady state operating current for the diode is applied from a D.C. source (not shown) connected to a terminal 50, and through a resistor 52 to the anode 34.

The circuit of FIG. 1 operates as follows. It may be assumed during this discussion that the low voltage state of the negative resistance diode represents one binary digit, for example, the binary digit zero, and the high voltage state the binary digit one. The direct current source connected to terminal 50 forward biases the diode to point 22 on the characteristic shown in FIG. 3. Direct current pulse source 3 applies a forward bias pulse 54 to the diode and direct current pulse source 38 applies a forward bias pulse 56 to the diode. Because of the low internal resistance of the diode, these applied pulses approximate constant-current pulses. The amplitudes of the pulses are such that one pulse is insufficient to drive load line 20 (representing now the load line for the diode 36) past point *b* in the curve, but two pulses together are sufficient to do so. Accordingly, when pulses 54 and 56 are applied concurrently, the diode is switched from its low voltage state 22 to its high voltage state 24 (FIG. 3). The diode now represents the binary digit one. If desired, this information may be read out of the diode at a later time.

The binary digit zero may be written into the diode by the same or a similar circuit using, however, two reverse bias pulses (of opposite polarity to pulses 54 and 56) instead of pulses 54 and 56 to switch the diode from its high (binary one) to its low (binary zero) state.

Read-out is accomplished by R.F. sources 46 and 48 and associated elements. These sources apply R.F. pulses (short bursts of R.F. signals) having a frequency 2*f* to the diode. These R.F. pulses are preferably in phase with respect to one another and travel through substantially the same lengths of transmission line. In any case, it is desired that the R.F. pulses reach the diode substantially in phase and are additive at the diode-anode 34. The means for synchronizing the R.F. pulses is indicated, and may include, for example, a common oscillator feeding two gates which are turned on simultaneously when it is desired to read information out of a particular diode. Any other suitable, known synchronizing means may be used.

FIG. 3 should be referred to again. Assume first that the diode is in the low voltage state represented by the point 22. The load line is arranged so that the current which causes the load line to drive from point 22 past point *b* (about 13 milliamperes in this example, as noted in FIG. 3) is substantially greater than the current required to drive the load line from point 24 past point *c* (here about 5 milliamperes, as noted in FIG. 3). A single R.F. pulse applied to the diode 36 when in its low voltage state causes the load line to vary between two extreme load lines indicated by the dashed lines 58 and 60. The state of the diode represented by the intersection of the load line and the curve 26 now varies along the curve between points 22*a* and 22*b*. This R.F. current is of insufficient amplitude to drive the diode 36 into its negative resistance region. When both *x* and *y* R.F. current pulses are applied at the same time to the diode 36 in its low voltage state, the current through the diode swings between two extreme load lines indicated by dashed lines 62 and 64, the point representing the state of the diode traveling along curve between points 22*c* and 22*d*. Again, the concurrent application of the two R.F. pulses alone is insufficient to drive the diode from the point 22 into its negative resistance region.

When the diode is in its high voltage state 24 and concurrent R.F. pulses are applied, the load line point representing the state of the diode 36 is driven from point 24 along curve 26 past point *c* and thence momentarily into the negative resistance region. The diode, when in its negative resistance region, acts like a generator. While it has been stated before that the negative resistance region of the diode is unstable and the diode normally has the tendency quickly to switch to its other stable state, this does not occur here. The reasons are not fully understood but it is believed that the diode is driven only slightly past point *c* and into a region where the effective negative resistance is relatively large and that there is less tendency for the diode to switch to its low voltage state when the negative resistance is large than when it is small. It is also believed that the relatively short time the diode remains in the negative resistance region during each cycle of the driving frequency is a factor which lessens the tendency of the diode to switch. (It might be mentioned here that with the circuit illustrated, if the diode is driven into its negative resistance region by an alternating signal from its low voltage state, the diode normally does switch. It should be noted that the slope of the negative resistance region near point *b* is different than that near point *c*, the former defining a low value of negative resistance and the latter a high value of negative resistance.)

The preferred frequency of the R.F. read signal is 2*f*. The frequency to which resonant circuit 49 is tuned is *f*. When the negative resistance diode is driven into its negative resistance region, resonant circuit 49 begins to oscillate at frequency *f*. The energy coupled from the diode to the resonant circuit reinforces the oscillations at the frequency *f*. This is shown in a qualitative way in FIG. 10. The cross-hatched areas 65 of the read signal represent the periods the diode is driven into its negative resistance region. The solid curve 67 represents the oscillations in the resonant circuit at frequency *f*. At each positive peak of signal 2*f*, the oscillations at frequency *f* are reinforced because of energy transfer into the tuned circuit.

Summarizing the operation described above, information is read into the diode by direct-current write pulses. The coincidence of two forward bias write pulses places the negative resistance diode 36 in its high voltage stable state (binary one) and the coincidence of two reverse bias write pulses places the diode in its low voltage stable state (binary zero). Information is read out of the diode by radio-frequency pulses at frequency 2*f*. When the diode is in its high voltage state, the combined radio-frequency pulses from sources 46 and 48 are sufficient periodically to drive the diode slightly into its negative resistance region. Parallel resonant circuit 48 which is tuned to a frequency *f* resonates under these conditions, the negative resistance diode 34 acting as a generator. When the diode is in its low voltage state, the coincident read signals do not drive the diode into its negative resistance region and resonant circuit 48 does not oscillate.

There still remains the problem of reading information out of the tuned circuit. This is done, according to the present invention, by sensing radiation from the tuned circuit. An antenna 66 is positioned to receive radiation from the tuned circuit. It applies the received signal to an amplifier 68 which in turn is connected to a utilization device (not shown).

The antenna 66 may be connected immediately adjacent to the resonant circuit 48 or spaced several feet or more from the resonant circuit. When the resonant circuit is very close to the antenna, the coupling to the antenna is both inductive and radiative (mainly inductive) and when the resonant circuit is further from the antenna, the coupling becomes radiative. For extremely high speed applications, the close spacing is preferred to reduce the time required for the radiated signal to reach the antenna. In certain very high speed applications, even the time required for the signal to traverse several feet is important. Also for these very high speed applications amplifier 68 should be broad band. It has to pass a very narrow, very steep radio-frequency pulse. The amplifier 68 may, for example, be a traveling wave tube, a parametric amplifier, or a negative resistance diode amplifier, for example.

For slower speed applications, the antenna 66 may be located of the order of 5 to 15 feet or so from the resonant circuit. The amplifier 66, in this case, can be less expensive and may be, for example, a standard transistorized circuit. For both high and lower speed computers, it is preferred to use a single antenna for all memory elements in one memory plane.

While an antenna is the preferred way of reading out information from the resonant circuit, other types of couplings may be employed. For example, direct resistive or capacitive coupling may be used. However, there should be sufficient isolation between the load and the tuned circuit to prevent excessive attenuation of the oscillations induced in the tuned circuit.

The resonant circuit 49 may be formed of lumped or distributed elements. For example, the circuit may be a quarter or half-wave transmission line, a cavity resonator, etc. In the latter case, the pickup means may be a probe or the like. For very high frequencies, the capacitance employed may be the distributed capacitance of diode 36 in which case the inductance should be of very low value. It should have a reactance of the same order of magnitude as this distributed capacitance. A circuit using the distributed diode capacitance is shown in FIG. 9. Capacitor 69 is the distributed capacitance of diode 36. Capacitor 71 is of high value—many times that of capacitor 36 and serves as the isolating element. The inductance is shown at 73 and it may be a distributed element.

A practical circuit such as shown in FIG. 1 may have the following circuit parameters:

Resistors 32 and 40—47 ohms each.
Resistor 52—1,000 ohms.
Current through resistor 52—12.5 milliamperes.
Peak-to-peak amplitude of each radio-frequency read pulse—200 millivolts.
Isolating element 47—47-ohm resistor.
Parallel tuned resonant circuit 49—a coil having sufficient distributed capacitance to act as a parallel resonant circuit having an oscillating frequency of 10.25 megacycles.

In another practical circuit according to the invention, a 0.1 microfarad capacitor is placed across diode 36. The distributed inductance of the capacitor leads is estimated to be approximately 0.5 microhenry. It resonates with the distributed capacitance across the diode which is believed to be about 100 to 200 micromicrofarads. The 0.1 microfarad capacitor itself serves as a D.C. blocking capacitor. The frequency of the resonant circuit was measured to be 15½ megacycles, which agrees well with what one would expect from the values of distributed capacitance and inductance given.

Figure 2:
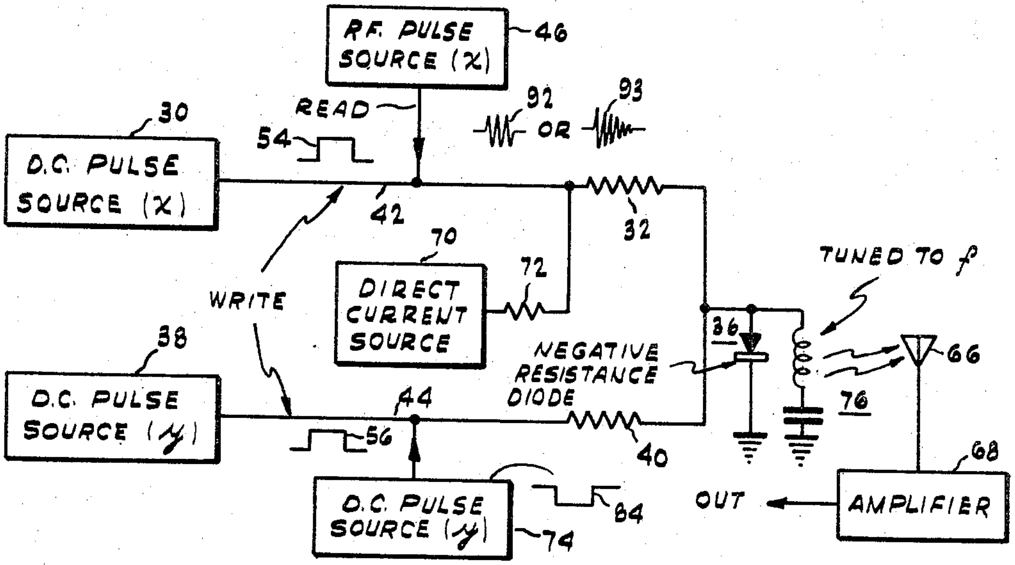
FIG. 2 is a block and schematic circuit diagram of another form of the present invention using a single R.F. source.

FIG. 2 illustrates a second embodiment of the present invention. Elements similar in function to corresponding elements in FIG. 1 have the same reference numerals applied. The writing portion of the circuit is the same as that of FIG. 1. The coincidence of two D.C. pulses 54 and 56 places the diode 36 in its high voltage state. In the embodiment of FIG. 1, the direct current bias is applied to the diode through a separate resistor 52. Accordingly, each diode of a memory array using the circuit of FIG. 1 has a separate resistor. In the embodiment of FIG. 2, direct current is applied through a resistor 72 from a direct current source 70 to $x$ bus 42. The source 70 and its resistor 72 may be common to all diodes connected to this $x$ bus.

In the embodiment of FIG. 1, two radio-frequency pulse sources 46 and 48 are employed for reading. In the embodiment of FIG. 2, one of the sources is a radio-frequency pulse source 46 but the second is a direct-current, reverse-bias pulse source 74. Alternatively, source 46 can be a source of negative pulses at a radio-frequency or lower repetition rate.

Another difference between the circuits of FIGS. 1 and 2 is the tuned circuit employed. FIG. 1 illustrates a parallel resonant circuit connected through an isolating element to the negative resistance diode. FIG. 2 employs a series resonant circuit 76 and it may be connected directly to the diode. It should be appreciated that the series circuit 76 of FIG. 2 may be used in the arrangement of FIG. 1 and likewise the isolating element 47 and parallel resonant circuit 49 of FIG. 1 may be used in the arrangement of FIG. 2.

Figure 4:
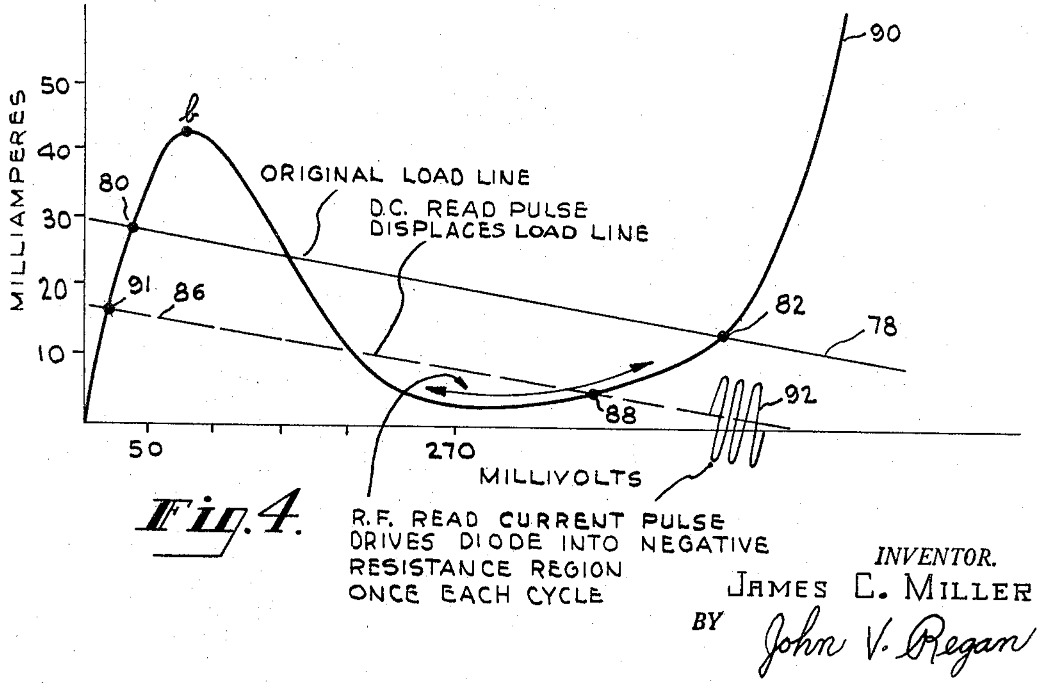

The operation of the circuit of FIG. 2 is illustrated in FIG. 4. The load line of the circuit when in its quiescent condition, that is, when direct current from source 70 is passing through diode 36, and neither pulse source 46 nor 74 is active, is shown at 78. When the diode is in its low voltage state, its voltage is that corresponding to point 80 and when the diode is in its high voltage state, its voltage is that corresponding to point 82. When the diode is in its high voltage state 82, the direct-current, negative-bias pulse 84 (FIG. 2) displaces the load line to position 86. The intersection 88 of the displaced load line with the volt-ampere characteristic 90 is still in the positive resistance region. If, in addition, the read current pulse 92, which is at frequency $2f$, is applied to the diode, it drives the diode into the negative resistance region $cb$ once each cycle. The series resonant circuit 76 then oscillates at frequency $f$ for reasons similar to those advanced previously in connection with the parallel resonant circuit 48 of FIG. 1.

When diode 36 is in its low voltage state 80, the combined direct-current pulse 84 and radio-frequency pulse 92 applied to the diode merely drives the point of intersection representing its condition along the positive resistance portion $ab$ of curve 90 to a point 91, so that the diode does not then act as a negative resistance and the tuned circuit 76 does not oscillate.

Summarizing the operation of the arrangement of FIG. 2, diode 36 may be placed in its high voltage state by means of write pulses 54 and 56. When it is placed in its high voltage state and a reverse-bias, direct-current pulse, and a radio-frequency pulse are simultaneously applied to the diode, the diode is periodically driven into its negative resistance region and tuned circuit 76 oscillates. When the diode is in its low voltage state, the combined radio-frequency and reverse-bias, direct-current pulse do not drive the diode into its negative resistance region and resonant circuit 76 does not oscillate. Oscillations in the resonant circuit are sensed by antenna 66 and amplifier 68 which operate in the manner previously described.

A memory matrix or memory plane is illustrated in FIG. 5. Although only three $x$ buses and three $y$ buses are shown, it will be appreciated that there may be many more of each and that there may be many more than nine memory elements. The $y$ read and write sources (not shown) may be of the type illustrated in FIG. 1 or of the type illustrated in FIG. 2. For example, a selected $x$ bus, say $x_1$, may correspond to bus 42 of FIG. 1 and a selected bus, $y_1$, may correspond to bus 44 of FIG. 1, and similar circuits may be provided for the other bus lines. The embodiment of FIG. 2 has the advantage that only a single radio-frequency pulse source is employed so that phasal relationships introduce no problems. Ordinarily, only one pair of read and one pair of write sources are needed for the entire memory plane. These are connected through switches (not shown) to the buses.

The sensing antenna 100 shown in FIG. 5 is common to all memory elements. It can be located between 1 and 15 feet from the tuned circuits. The antenna may be a dipole which is tuned to the frequency $f$ of the described tank circuits. Alternatively, it may be any one of many different commonly employed antennas.

A memory plane employing strip transmission line techniques is illustrated schematically in FIGS. 6, 7, and 8. The tuned circuits are represented for convenience schematically by lumped circuit elements at 102. However, as is well understood in this art, such circuits may appear physically as quarter or half wave length resonant stubs depending upon the particular tuned circuit configuration desired. The negative resistance diodes are not shown in FIG. 6 but would extend through the dielectric 104 and, if necessary, beyond the ground plane 106. Typical strip transmission line circuits of this type are known in the art and are, for example, illustrated in Patent No. 2,874,-276, issued Feb. 17, 1959.

Resistors may be printed on the front face of the dielectric medium by conventional printed circuit techniques. The antenna 108 is a near field antenna. It is imbedded in the dielectric along a path passing in close proximity to each resonant circuit. FIGS. 7 and 8 show one possible configuration for the antenna 108.

In the foregoing discussion of various embodiments of the invention, the resonant circuit coupled to the diode is said to be tuned to frequency $f$ and the driving frequency to be preferably $2f$. While this circuit is the preferred one, others are possible. For example, the driving frequency may be a higher harmonic of $f$ or a subharmonic of $f$. The former is not as efficient as using $2f$, the latter introduces noise problems in the readout. It is also to be understood that the resonant frequency of the tank circuit not necessarily be harmonically or subharmonically related to $f$, however, improved performance is obtained with the preferred $2f$ driving and $f$ resonant circuit frequencies given.

The invention described has a number of very important advantages. For example, only one negative resistance diode is required for each bit of information. The read-out may be non-destructive. This non-destructive feature may be mode definitely assured by using a readout radio-frequency signal the amplitude of which decreases or tapers as a function of time, as shown schematically in FIG. 2 at 93, so that at the end of the oscillating period the diode is sure to remain in its high voltage state. (The tapered signal may be obtained from any one of a number of well-known circuits. For example, a shock excited tank circuit or an oscillator gated by a sawtooth pulse may be employed for stage 46 of FIG. 2 or stages 46 and 48 of FIG. 1.) There is little interference between bits of stored information since storage is in the form of a direct voltage. There is very good signal-to-noise ratio readout since the tuned circuit operates at a subharmonic of the applied radio-frequency. Accordingly, the interrogating signal has very little influence on other storage elements around the antenna pickup. Finally, a single memory plane or matrix serves for both reading and writing.

The use of a negative resistance diode as the negative resistance element is highly advantageous in the present invention in a number of respects. For example, the diode is small, requires little power, is capable of very high speed operation, and, in production quantities, is expected to be a relatively low cost element.

While the invention is described in terms of a memory circuit, the inventive concept is useful in other areas. For example, the diode may be normally maintained in its high voltage state and keyed into oscillations by a modulating signal to provide a portion of a transmitter. The keying signal may be derived from stage 74 (FIG. 2) and may be in the form of long or short pulses (dots and dashes), and the source 46 (FIG. 2) may either be keyed synchronously with stage 74 or be on continuously. Other possibilities include pulse position and pulse width modulation. The invention is also useful as an oscillator, preferably with a $2f$ driving frequency and $f$ resonant circuit frequency.

What is claimed is:

1. A memory circuit comprising, in combination, a diode which exhibits a negative resistance in one region of its operating range and which is capable of assuming a high voltage state in response to a direct-current pulse of one sense and a low voltage state in response to a direct-current pulse of opposite sense; a resonant circuit coupled to said diode which is capable of oscillating at a freqeuncy $f$ when the diode is driven into its negative resistance region from one of its states but not from the other; and means for applying energy to the diode at a frequency $2f$ which, when said diode is in said one state, periodically drives the same into its negative resistance-operating region, and said resonant circuit oscillates at frequency $f$.

2. A memory circuit comprising, in combination, a diode which exhibits a negative resistance in one region of its operating range and which is capable of assuming a high voltage state in response to a direct-current pulse of one sense and a low voltage state in response to a direct-current pulse of opposite sense; a parallel resonant circuit coupled to said diode which is capable of oscillating at a frequency $f$ when the diode is driven into its negative resistance region from one of its states but not from the other; and means for applying radio-frequency energy to the diode at a frequency $2f$ which, when said diode is in said one state, periodically drives the same into its negative resistance region and said resonant circuit oscillates at a frequency $f$.

3. A memory circuit comprising, in combination, a diode which exhibits a negative resistance in one region of its operating range and which is capable of assuming a high voltage state in response to a direct-current pulse of one sense and a low voltage state in response to a direct-current pulse of opposite sense; a series resonant circuit coupled to said diode which is capable of oscillating at a frequency $f$ when the diode is driven into its negative resistance region from one of its states but not from the other; and means for applying radio-frequency energy to the diode at a frequency $2f$ which, when said diode is in said one state, periodically drives the same into its negative resistance region and said resonant circuit oscillates at a frequency $f$.

4. A memory circuit comprising, in combination, a diode which exhibits a negative resistance in one region of its operating range and which is capable of assuming a high voltage state in response to a direct-current pulse of one sense and a low voltage state in response to a direct-current pulse of opposite sense; a resonant circuit coupled to said diode which is capable of oscillating at a frequency $f$ when the diode is driven into its negative resistance region from one of its states not not from the other; and means for simultaneously applying a pair of in phase radio-frequency pulses to the diode at a frequency $2f$ which, when said diode is in said one state, periodically drives the same into its negative resistance region and said resonant circuit oscillates at a frequency $f$.

5. A memory circuit comprising, in combination, a diode which exhibits a negative resistance in one region of its operating range and which is capable of assuming a high voltage state n response to a direct-current pulse of one sense and a low voltage state in response to a direct-current pulse of opposite sense; a resonant circuit coupled to said diode which is capable of oscillating at a frequency *f* when the diode is driven into its negative resistance region from one of its states but not from the other; means for applying a reverse-bias, direct-current pulse to said diode, whereby, when the diode is in its high voltage state, said pulse drives said diode toward the negative resistance region of its operating range; and means for applying a radio-frequency pulse at a frequency 2*f* to said diode having an amplitude sufficient, when combined with said reverse bias pulse, periodically to drive said diode from its high voltage state to its negative resistance region.

6. A memory circuit comprising, in combination, a diode which exhibits a negative resistance in one region of its operating range and which is capable of assuming a high voltage state in response to a direct-current pulse of one sense and a low voltage state in response to a direct-current pulse of opposite sense; a resonant circuit coupled to said diode which is capable of oscillating at a frequency *f* when the diode is driven into its negative resistance region from one of its states but not from the other; means for applying radio-frequency energy to the diode at a frequency 2*f* which, when said diode is in said one state, periodically drives the same into its negative resistance region and said resonant circuit oscillates at a frequency *f*, and antenna means operatively associated with said resonant circuit for receiving energy at frequency *f* radiated from said resonant circuit.

7. Logic circuit means comprising an impedance unit having a natural frequency of oscillation, said unit including a quantum mechanical tunneling device, and means connecting the tunneling device in a circuit, said tunneling device having a potential-current characteristic including an intermediate potential negative resistance region between lower and higher potential positive resistance regions; a plurality of input sources of electrical energy coupled to the circuit, at least some of the sources being shiftable in potential, said sources cooperating in at least one predetermined combination of the potentials thereof to operate the tunneling device in the intermediate potential negative resistance region of its characteristic and thereby to initiate oscillation of said circuit, in at least a second predetermined potential combination to operate the tunneling device in the lower potential positive resistance region and thereby to inhibit oscillation of said circuit, and in at least a third predetermined potential combination to operate the tunneling device in the higher potential positive resistance region of its characteristic and thereby to inhibit oscillation of said circuit; and signal output means coupled to the circuit and responsive to oscillation and non-oscillation thereof, whereby said one predetermined combination may be logically distinguished from said other second and third predetermined combinations.

8. Logic circuit means comprising an impedance unit having a natural frequency of oscillation, said unit including a quantum mechanical tunneling device, and means connecting the tunneling device in a circuit, said tunneling device having a potential-current characteristic including a negative resistance region between two positive resistance regions; a plurality of input sources of electrical energy coupled to the circuit, at least some of the sources being shiftable in potential, said sources cooperating in at least one predetermined combination of the potentials thereof to operate the tunneling device in the negative resistance region of its characteristic and thereby to initiate oscillation of said circuit and in at least one other predetermined potential combination to operate the tunneling device in the lower potential region of said two positive resistance regions of its characteristic and thereby to inhibit oscillation of said circuit; and signal output means coupled to the circuit and responsive to oscillation and non-oscillation thereof, whereby said one predetermined combination may be logically distinguished from said other predetermined combination.

9. In combination, a negative resistance diode which is bistably biased to assume a quiescent operating point in either one of two stable states; a resonant circuit coupled to the diode which oscillates when the diode is driven into its negative resistance region from one of said states; and an antenna in operative relation with said resonant circuit for receiving a signal from said resonant circuit at the frequency to which said resonant circuit is tuned, when said resonant circuit oscillates.

10. A memory circuit comprising, in combination, a diode having high and low voltage states and exhibiting a negative resistance in a region of its operating range between these states; means for quiescently biasing said diode for bistable operation in one of its high and low voltage states; and means for concurrently applying a reverse-bias, direct-current pulse and a radio-frequency pulse to said diode of combined amplitude sufficient to drive said diode, when in its high voltage state, from said high voltage state into its negative resistance region.

11. In combination, an electrical circuit which includes a negative resistance diode having two stable regions in its operating range and an unstable negative resistance region in an operating range between the two positive resistance regions; circuit means capable of resonating under the influence of energy passing through the diode coupled to the diode; means for quiescently biasing said diode for bistable operation in said two stable regions; means for establishing the operating point of the diode in either one of said stable regions; and means for periodically changing the operating point of the diode through a predetermined range which is sufficient, in one stable state of the diode, to drive the diode from its established operating point into its unstable region and thereby to cause the circuit means capable of resonating to resonate.

12. In combination, a negative resistance diode; a resonant circuit tuned to frequency *f* coupled to the diode; and means for driving the diode into its negative resistance region at a frequency 2*f*.

13. In combination, a negative resistance diode; a parallel resonant circuit tuned to frequency *f* coupled to the diode; and means for driving the diode into its negative resistance region at a frequency 2*f*.

14. In combination, a negative resistance diode; a series resonant circuit tuned to frequency *f* coupled to the diode; and means for driving the diode into its negative resistance region at a frequency 2*f*.

15. In combination, a negative resistance diode; a resonant circuit tuned to frequency *f* coupled to the diode; means for driving the diode into its negative resistance region at a frequency 2*f*; and antenna means coupled to said resonant circuit for receiving a signal at a frequency *f* when said resonant circuit oscillates.

16. In combination, an active element having two regions in its operating range exhibiting a positive resistance, and a region between these positive resistance regions exhibiting a negative resistance; means applying a quiescent bias to said element having a value such that more energy is required to drive said element from one of its positive resistance regions to its negative resistance region than to drive said element from its other positive resistance region to its negative resistance region; and means for applying an alternating signal to said element having a peak value which is sufficient to drive said element into its negative resistance region from said one positive resistance region but not from its other.

17. In combination, an active element having two regions in its operating range exhibiting a postive resistance, one at a lower voltage level and the other at a higher voltage level, and a region between these positive resistance regions exhibiting a negative resistance; means applying a forward-bias, direct-current to said element having a value such that a greater change in current is required to drive the element from one positive resistance region to its negative resistance region than to drive the element from its other positive resistance region to its negative resistance region; and means for applying a varying current to said element having a peak value which is sufficient to drive the element into its negative resistance region from said one postive resistance region but not from its other.

18. In combination, a diode having two regions in its operating range exhibiting a positive resistance, one at a lower voltage level and the other at a higher voltage level, and a region between these positive resistance regions exhibiting a negative resistance; means applying a forward-bias, direct-current to said diode having a value such that a greater change in current is required to drive the diode from its lower voltage positive resistance region to its negative resistance region than to drive the diode from its higher voltage positive resistance region to its negative resistance region; and means for applying a varying current to said diode having a peak value which is sufficient to drive the diode into its negative resistance region from its higher voltage level but not from its lower voltage level.

19. In the combination as set forth in claim 18, said means for applying a varying current comprising means for producing a sinusoidal current.

20. In the combination a set forth in claim 18, said means for applying a varying current comprising means producing an alternating current and means producing a direct-current.

21. In the combination as set forth in claim 18, said means for applying a varying current including means providing a radio-frequency current.

22. A memory circuit including a negative resistance diode across which oscillations are produced during a readout cycle, and means for ascertaining the diode state comprising means for sensing radiation at the oscillating frequency.

23. In a memory circuit, a plurality of negative resistance diodes across one of which oscillations may be produced when reading stored information out of said circuit; and a single antenna in the radiation field of all of said diodes for sensing the presence of oscillations across one of said diodes.

24. A memory plane comprising, in combination, a plurality of negative resistance diodes each having two regions in its operating range exhibiting a positive resistance, and a region between these positive resistance regions exhibiting a negative resistance; a plurality of $x$ leads; a like plurality of $y$ leads, each diode being connected to one $x$ lead and one $y$ lead and all diodes being connected to different pairs of said leads; means applying a forward quiescent bias current to all of said diodes having a value such that more energy is required to drive each diode from one of its positive resistance regions to its negative resistance region than to drive said diode from its other positive resistance region to its negative resistance region; and means for applying an alternating signal to one $x$ lead and an alternating signal to one $y$ lead, said two signals togther having an amplitude sufficient to drive the diode connected to said one $x$ and said one $y$ lead into its negative resistance region from said one positive resistance region but not from the other.

25. A memory plane as set forth in claim 24, further including a resonant circuit coupled to each diode tuned to frequency $f$, and wherein said two applied alternating signals are at frequency $2f$.

26. In combination a circuit having an active element with positive and negative resistance operating regions; means in circuit with the element which oscillates when the element is driven back and forth between one positive operating resistance region and its negative resistance operating region; means for establishing the operating point of the element in a positive resistance region of its operating range; and means for driving the operating point of the element back and forth between its negative resistance operating region and said one positive resistance operating region, whereby the element supplies energy to said means and oscillations are produced.

27. A memory circuit comprising, in combination, a negative resistance active element having two positive resistance regions and a negative resistance region between the two positive resistance regions; means for establishing an operating point in either one of the two positive resistance regions; and means for non-destructively ascertaining the positive resistance region which includes said operating point including means for moving said operating point into said negative resistance region.

28. A memory circuit comprising, in combination, a negative resistance active element having two positive resistance regions and a negative resistance region between the two positive resistance regions; means for establishing an operating point in either one of the two positive resistance regions; and means including a source supplying an alternating current signal the amplitude of which decreases with time for non-destructively ascertaining the positive resistance region which includes said operating point.

29. In a memory circuit, a plurality of resonant circuits; a pair of connections individual to each circuit to which coincident drive signals may be applied for selectively driving said resonant circuits into oscillation; and a single antenna in the radiation field of all of said circuits for sensing the presence of oscillations in said circuits.

30. In a system including a plurality of circuits each having an active element with positive and negative resistance regions and each of which circuits may be made to oscillate when its element is driven into its negative resistance region; a pair of connections individual to each circuit to which coincident drive signals may be applied; and a single antenna in the radiation field of all of said circuits for sensing the presence of oscillations in any one of said circuits.

31. In a memory circuit, a plurality of active elements each having two positive resistance regions defining two stable states of the element and a negative resistance region between the two positive resistance regions; means for writing information into said active elements comprising means for establishing desired positive resistance operating points for each; and means for reading information out of said active elements comprising coincident drive circuits for each element for driving the elements into their negative resistance region from one positive resistance region but not from the other, circuit means individual to each element, each said circuit means being capable of oscillating when its element is in the negative resistance region of its operating range, and an antenna for sensing the presence of oscillations.

32. In combination, an active element having a negative resistance operating region; a resonant circuit tuned to frequency $f$ coupled to said element; and means for driving said element into its negative resistance region at a frequency $2f$.

References Cited

UNITED STATES PATENTS

| | | | |
|---|---|---|---|
| 2,154,484 | 4/1939 | Bell | 331—51 |
| 2,692,947 | 10/1954 | Spencer | 340—173.2 |
| 2,838,687 | 6/1958 | Clary | 330—5 |
| 2,877,359 | 3/1959 | Ross | 340—173 |
| 2,975,377 | 3/1961 | Price et al. | 307—88.5 |
| 2,986,724 | 5/1961 | Jaeger | 307—88.5 |

(Other references on following page)

FOREIGN PATENTS 159,041 9/1954 Australia.

OTHER REFERENCES

Appleton and Van der Pol in the Philosophical Magazine and Journal of Sciences, vol. 43, 1922, pp. 177–193.

Gabel: The Wireless World and Radio Review, 10–1, 1924 pp. 2–5.

Gabel: The Wireless World and Radio Review, 10–8, 1924 pp. 47–50.

Lossev: The Wireless World and Radio Review, 10–22, 1924 pp. 93–96.

Tremaine in "The Audio Cyclopedia," April 1959 see question 12.114.

BERNARD KONICK, *Primary Examiner.*

HERMAN K. SAALBACH, IRVING L. SRAGOW, *Examiners.*

J. W. CALDWELL, T. W. FEARS, *Assistant Examiners.*